March 8, 1932.  H. LEVISON  1,848,365
LOCKING STRIP
Filed Aug. 9, 1929
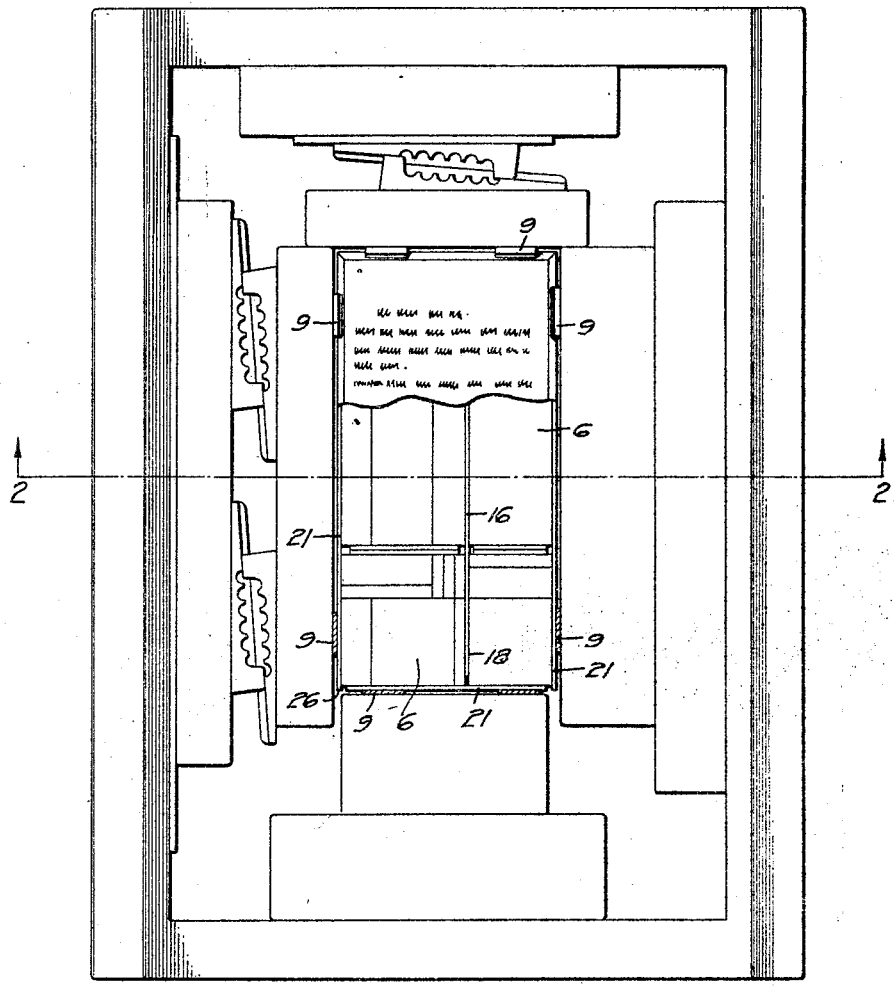
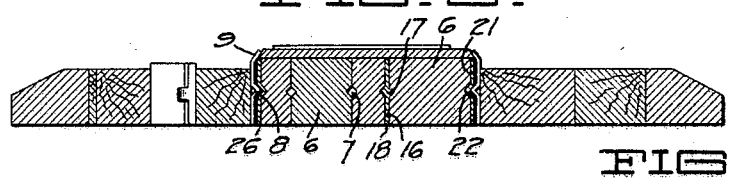
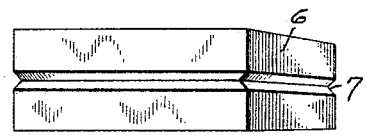 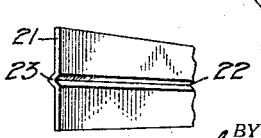
INVENTOR
Harry Levison
BY
ATTORNEYS Patented Mar. 8, 1932

1,848,365

UNITED STATES PATENT OFFICE

HARRY LEVISON, OF SAN FRANCISCO, CALIFORNIA

LOCKING STRIP

Application filed August 9, 1929. Serial No. 384,717.

My invention relates to the means which are utilized for securing to a suitable mounting block unmounted printing plates such as electrotypes, stereotypes, half tones, zinc etchings and other plates useful in printing and allied arts. This means is conveniently utilized in conjunction with the mounting means described and claimed in my co-pending application Serial Number 251,029, filed February 1, 1928. As is there set forth, it is possible to mount the plate in the form detachably to the block or blocks by means of a simple, inexpensive and readily manipulated clamping means. This obviates those difficulties and objectionable features attendant upon the mounting of the plates upon a permanent base. Not only is the space required for storage of the plates after use materially reduced, but the mounting of the plate is effected in such a manner that a more desirable set-up in the press is possible.

The printing plates to be mounted usually vary considerably in their dimensions, since they are suited to the matter to be illustrated. Accordingly, it is most convenient to mount the plate upon a plurality of blocks so related that the area necessary to adequately support the plate is available. When the set-up is substantially complete, the printing plate is secured to the blocks by the previously mentioned mounting means and is locked within a suitable enclosing means as a chase by locking means such as quoins. When the chase is subsequently handled, it sometimes happens that one of the several blocks supporting the plate will, for various reasons, slip out of position. This is an undesirable feature, and, in general, it is the object of my invention to provide suitable means for the locking of the various blocks together in such a manner that they cannot subsequently be readily displaced from their position.

Another object of my invention is the position of a locking means for securing the supporting blocks together, which can be utilized in conjunction with the clamping means described in my aforementioned co-pending application.

A further object of my invention is the provision, in combination with blocks having a groove or channel, of a locking strip having an outwardly-extending projection or teat, which is adapted to engage the channel in the blocks to secure them together.

My invention possesses other advantageous features and objects, some of which, with the foregoing, will be set forth in the following description of my invention. It is to be understood that I do not limit myself to the showing made by the description, as I may adopt various forms of my invention within the scope of the claim. Further, it is to be understood that the claim is to be accorded a range of equivalents consistent with the state of the prior art.

In the drawings to which reference will be made in the accompanying description:

Figure 1 is a plan view of a chase and a printing plate, the printing plate being broken away to illustrate the manner of providing the blocks to support the plate, and of the locking strip for securing the several blocks together. Within the chase, suitable furniture and locking means have been shown for positioning the several elements within the chase.

Figure 2 is a transverse section taken on the line 2—2 of Fig. 1.

Figure 3 is a perspective view of a channeled block which is readily utilized in combination with the locking strip means.

Figure 4 is a view in perspective of one form of strip which I have successfully utilized.

Figure 5 is another form of locking strips which I have employed.

In mounting a printing plate within a chase, in accordance with my invention, a plurality of the blocks 6, are conveniently provided. These blocks may be formed of a suitable material, either wood, composition or metal. Each of the several blocks has a laterally extending groove, channel or indentation 7. This channel is adapted to cooperatively engage an extending teat or projection 8, provided upon a clip 9. As is described in my co-pending application, the clip, upon the locking of the chase, positively secures and positively presses the printing plate down upon the supporting block.

Since it is most convenient and economical to provide the support for the printing plate by combining a number of the blocks to secure the desired area, a plurality of these are usually assembled much after the fashion shown in Fig. 1, to support the plate in the form. However, upon the handling of the chase or other form retaining means, subsequent to the locking up, it sometimes happens that the blocks become displaced from their position. This is extremely undesirable, as may be readily imagined. To overcome this difficulty, I have provided, in accordance with my invention, clip means for securing the blocks against displacement. This clip means is conveniently formed by a strip 16, as is shown in Fig. 5, having extending projections or teats 17, which are adapted to engage the channel or groove in the blocks. This strip is conveniently inserted between adjacent blocks, as I have indicated at 18 in Fig. 2, with the projections 17 in engagement with the channels in adjacent blocks. Upon a locking of the locking means, the blocks are secured together within the chase, and cannot be subsequently displaced relative to each other.

In those instances, where it is desirable to lock several blocks together and where it is desired that the channel or groove in the block be still available for cooperation with the clamping means such as the clip 9, I preferably form the strip 21, as is shown in Fig. 4, in such a manner that a groove 22 is provided in the strip, and forms a projection or teat 23. Upon a positioning of the strip with the projection or teat 23 engaging a channel in the block, the groove 22 is available for cooperation with the clamping means. Thus, as I have indicated at 26, the strip 21 is provided extending along the outer edge of the supporting blocks, with the groove so disposed that it is readily available for cooperation with the clamping means.

In those instances where the blocks do not fit exactly to the area of the plate to be mounted, minor variations in size can be cared for by suitable combinations of the strips 16 and 21. It is of course apparent that further modifications and uses will be readily realized by those skilled in the art, upon consideration of the forms of my invention which I have described, without departing from the spirit thereof.

I claim:

In combination with a block for detachably supporting a printing plate, said block having a V-shaped groove extending along all sides thereof and adapted to be engaged to press a printing plate down upon the block, clip means for securing the block to a second block having a like V-shaped groove extending along all sides of the same, the clip means including projecting V-shaped portions adapted to engage a groove in each of the blocks to secure the blocks together.

In testimony whereof, I have hereunto set my hand.

HARRY LEVISON.